United States Patent [19]
Renner

[11] Patent Number: 5,140,616
[45] Date of Patent: Aug. 18, 1992

[54] NETWORK INDEPENDENT CLOCKING CIRCUIT WHICH ALLOWS A SYNCHRONOUS MASTER TO BE CONNECTED TO A CIRCUIT SWITCHED DATA ADAPTER

[75] Inventor: Robert E. Renner, Phoenix, Ariz.

[73] Assignee: AG Communication Systems Corporation, Phoenix, Ariz.

[21] Appl. No.: 615,524

[22] Filed: Nov. 19, 1990

[51] Int. Cl.⁵ ............................................. H04L 7/04
[52] U.S. Cl. ....................................... 375/107; 375/8; 375/109; 379/93
[58] Field of Search ............... 375/106, 107, 109, 120, 375/7, 8; 370/103; 455/69, 71; 358/149; 331/2; 379/93, 97, 98

[56] References Cited
U.S. PATENT DOCUMENTS 3,504,125  3/1970  Inose et al. ..................... 370/103
3,560,869  2/1971  Miller ............................. 375/109

*Primary Examiner*—Benedict V. Safourek
*Attorney, Agent, or Firm*—Anthony J. Baca

[57] ABSTRACT

In order to accomplish the object of the present invention there is provided a network independent clocking (NIC) circuit which allows a local synchronous master to exchange data with a local data adpater. The NIC circuit includes a phase measuring block for continually generating a local phase difference indicator, where the local phase difference indicator indicates a phase relation between the local data adapter and the local synchronous master. The local phase difference indicator is transmitted to a remote data adapter. Back locally, a phase difference indicator is received from a remote data adapter. A baud clock is generated and used to transfer data from the data adapter to the synchronous master, the baud clock generator uses the phase difference indicator to recreate the phase difference between the remote data adaper and the remote synchronous master.

6 Claims, 9 Drawing Sheets

NETWORK INDEPENDENT CLOCKING CIRCUIT WHICH ALLOWS A SYNCHRONOUS MASTER TO BE CONNECTED TO A CIRCUIT SWITCHED DATA ADAPTER

CROSS-REFERENCE TO RELATED APPLICATIONS

The present application is related to the following co-pending U.S. patent applications all being assigned to the same assignee, entitled:

"A SIMULTANEOUS VOICE AND DATA SYSTEM USING THE EXISTING TWO-WIRE INTERFACE", Ser. No. 07/615,679 filed Nov. 19, 1990;

"A CIRCUIT AND METHOD OF HANDLING ASYNCHRONOUS OVERSPEED", Ser. No. 07/615,525 filed on Nov. 19, 1990;

"A METHOD OF IMPLEMENTING ECMA 102 RATE ADAPTION", Ser. No. 07.615,661 filed on Nov. 19, 1990;

"A METHOD OF IMPLEMENTING ECMA 102 RATE DEADAPTION", Ser. No. 07/617,848 filed on Nov. 19, 1990.

FIELD OF THE INVENTION

The present invention relates in general to telecommunication systems, and more particularly a circuit which allows an external synchronous data master to be connected to a Data Adapter. Phase relationship between the external master and the Data Adapter is transferred to the far-end Data Adapter.

BACKGROUND OF THE INVENTION

Prior to the present invention, connecting synchronous masters to each other was very awkward. Generally this task was accomplished by connecting the first master to a slave unit which in turn was connected to an elastic buffer. The elastic buffer was then connected to a second slave unit which was connected to the second master (here, the second master would be a Data Adapter). With this arrangement, some kind of "flow" control was required because inevitably, one of the masters transmitted at a slightly higher rate.

Because of the nature of the Data Adapter, it is synchronized to the Central Office (CO) and is generally a master for synchronous data. But limiting the Data Adapter to only external slave devices is to restrictive.

It therefore becomes the object of the present invention to provide an apparatus which allows an external master device to be connected to a Data Adapter.

SUMMARY OF THE INVENTION

In order to accomplish the object of the present invention there is provided a network independent clocking (NIC) circuit which allows a local synchronous master to exchange data with a local data adapter. The NIC circuit includes a phase measuring block for continually generating a local phase difference indicator, where the local phase difference indicator indicates a phase relation between the local data adapter and the local synchronous master. The local phase difference indicator is transmitted to a remote data adapter. Back locally, a phase difference indicator is received from a remote data adapter. A baud clock is generated and used to transfer data from the data adapter to the synchronous master, the baud clock generator uses the phase difference indicator to recreate the phase difference between the remote data adapter and the remote synchronous master.

DESCRIPTION OF THE DRAWINGS

A better understanding of the invention may be had from the consideration of the following detailed description taken in conjunction with the accompanying drawings, in which.

DESCRIPTION OF THE PREFERRED EMBODIMENT

Figure 1:
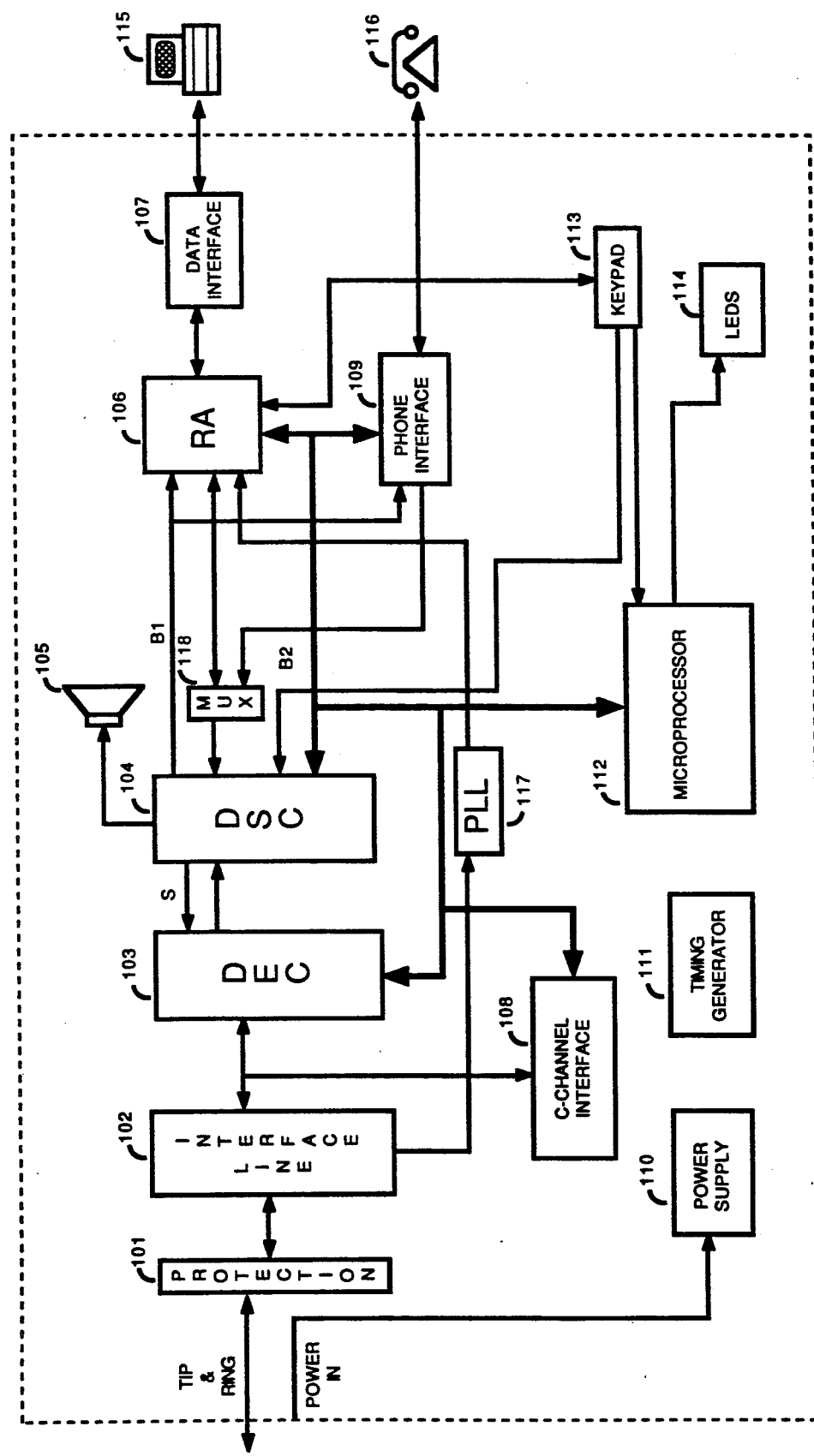
FIG. 1 is a block diagram of the Data Adapter in accordance with the present invention.

The present invention allows a synchronous master to be connected to the Data Adapter, which is also a synchronous master. The present invention sends clocking information to the far-end and receives similar clocking information from the far end. This clocking information contains the phase relation between the external synchronous master's clock and the Data Adapter's master clock. Turning now to FIG. 1 a general description of the Data Adapter will be given before the invention is described. A more detailed description of the Data Adapter is given in "A SIMULTANEOUS VOICE AND DATA SYSTEM USING THE EXISTING TWO-WIRE INTERFACE" Ser. No. 07/615,679.

Data from DATA INTERFACE 107 is passed to RA 106 where the data is "Rate Adapted" in accordance to the European Computer Manufacturers Association (ECMA) standard, onto one of the 64Kbps channels. The voice signal is converted to a 64Kbps Pulse Coded Modulation (PCM) signal by PHONE INTERFACE 109 and occupies a second 64Kbps channel. Both 64Kbps channels are multiplexed along with data from MICROPROCESSOR 112 for the 16Kbps channel by MUX 118 and then shifted into Digital Subscriber Controller (DSC) 104. These three channels are converted to a analog signal suitable for transmission over a four-wire interface, one such format is the Integrated Services Digital Network (ISDN) S interface signal. The analog signal from the DSC is received by Digital Exchange Controller (DEC) 103 and converted back to a digital Time Division Multiplexed (TDM) signal. At this point, a 64Kbps control channel from C-CHANNEL INTERFACE 108 is multiplexed into the TDM data stream. The C-CHANNEL is used to control and determine status of LINE INTERFACE 102. Note: the 8Kbps auxiliary channel is part of this control channel.

The digital TDM data stream from DEC 103 and the 8Kbps auxiliary channel are converted into an appropriate signal for transmission over a twisted-pair line. The signal from LINE INTERFACE 102 is transmitted through a PROTECTION circuit 101 to the Central Office (CO), where an identical line interface receives the signal and reconstructs the digital data.

Functionally, the DA consists of two separate circuits: The Call Processing Computer (MP) and the Rate Adapter (RA). The former operates under control of MICROPROCESSOR 112; the later operate under a digital signal processor.

The RS-232C/V.35 interface (DATA INTERFACE 107) circuits reside on DARI/DAVI baby boards, respectively. Note: only a RS-232C or V.35 is equipped at any one time. Serial communication to/from RS-232C and V.35 is controlled by RA 106. Data transfer rate is switch selectable via DIP-switches mounted on KEYPAD 113 baby board, or, automatic if Data Adapter operates in auto-bauding mode. The RS-232C baby board is strap selectable to operate in one of the following modes:

DTE synchronous
DTE asynchronous
DCE synchronous
DCE asynchronous.

The V.35 baby board is strap selectable to operate in one of the following modes:

DTE synchronous
DCE synchronous.

Still referring to FIG. 1, the LINE INTERFACE 102 circuit is comprised of a Digital Interface Circuit (DIC) and associated circuitry, and is transformer coupled to a two wire line to the CO. The DIC provides a high-speed, full duplex digital transmission link using echo-cancelling techniques. This circuit in turn interfaces to the DEC 103 and DSC 104. The later device provides an interface to the SPEAKER 105 and PHONE INTERFACE 109.

Two channels at 64Kbps, one channel at 16Kbps, and an 8Kbps maintenance or utility channel are transported between the DIC and equivalent circuit at the CO. One 64Kbps channel is allocated for circuit switch data transmission, the other is for voice transmission. The 16Kbps channel is used for the interchange of information between the CO and DA for call setup, release, ringing, call progress tone, etc.

The DIC chip, a MITEL 8972, operates in the slave mode. Phase Locked Loop (PLL) 117 locks onto the C4 (4.096 Mhz) clock from the DIC and generates a 1.344 Mhz for use by the baud rate generator. This allows the clock signal and thus the USER equipment 115 to be synchronized to the CO.

Figure 2:
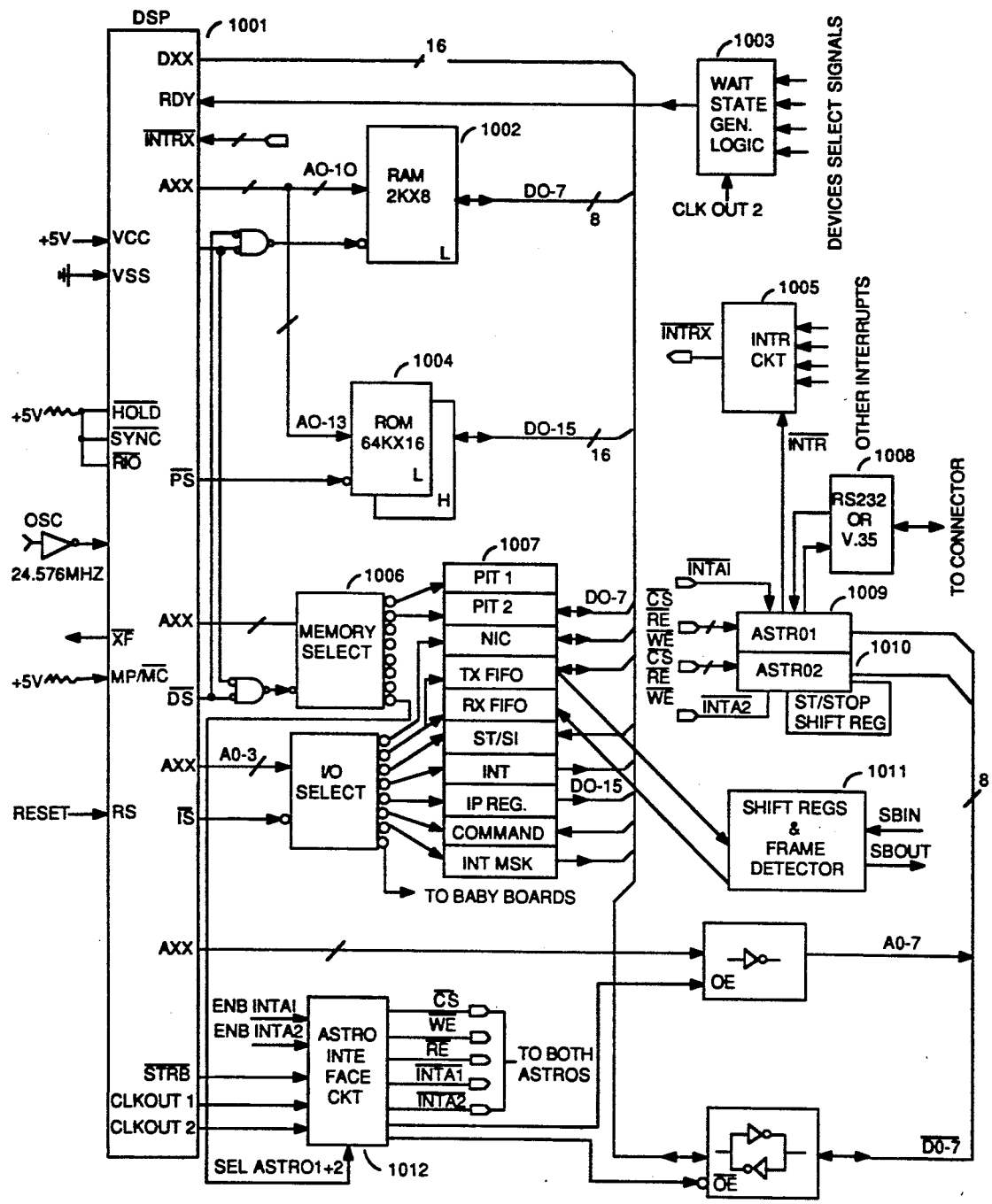
FIG. 2 is a block diagram of the Rate Adapter.

Referring to FIG. 2. Due to extensive data manipulation by firmware for rate adaption/deadaption, a TMS320C25 DSP 1001 is used. The 16-bit DSP is designed to execute one instruction per clock cycle, at 10Mhz real clock speed. However, for this RA circuit, the DSP will run at 6.144Mhz real clock speed or clock period equal 162.5 nano-seconds. The RA is described in more detail in co-pending application "A SIMULTANEOUS VOICE AND DATA SYSTEM USING THE EXISTING TWO-WIRE INTERFACE", "Ser. No. 07/615,679" and "A METHOD OF IMPLEMENTING ECMA 102 RATE ADAPTION", "Ser. No. 07/615,661".

Block 1007 of FIG. 2 contains many of the standard devices shown as a block or registers. It is not necessary to show all the connections, such as address, data, and control because this is dependent on which IC is chosen to accomplish the stated task. The Network Independent Clocking 1007 is accessed as I/O by DSP 1001.

Referring to FIGS. 3, 4, 5, 6, and 7, and TABLES 1, 2, and 2. The DA normally derives its baud rate timing from the received bit stream of the DA/Network interface, through the PLL 117 of FIG. 1, and PITI 1007 of FIG. 2. This timing is used by the DA to provide the connected synchronous equipment with transmitter element timing on Circuit 114 and receiver element timing on Circuit 115. However, for cases where the equipment is unable to accept timing (e.g. a synchronous modem), it is necessary to carry clocking information across the link (B-channel). When the DA uses this option, it must generate and utilize clocks which are thus not necessarily synchronized to the network or each other.

TABLE 1

E-Bit Usage vs. User Data Rate

| Intermediate Rates Kbps | | | E-Bits | | | | | | |
|---|---|---|---|---|---|---|---|---|---|
| 8 bps | 16 bps | 32 bps | E1 | E2 | E3 | E4 | E5 | E6 | E7 |
| 600 | | | 1 | 0 | 0 | C | C | C | M |
| 1200 | | | 0 | 1 | 0 | C | C | C | 1 |
| 2400 | | | 1 | 1 | 0 | C | C | C | 1 |
| | 7200 | 14400 | 1 | 0 | 1 | C | C | C | 1 |
| 4800 | 9600 | 19200 | 0 | 1 | 1 | C | C | C | 1 |

1) The M bit is used for multiframe synohronization as recommended by CCITT I.460.
2) The C bits transport the Network Independent Clocking information.

TABLE 2

Ra1 Frame Structure

| Octet Number | Bit Position Number | | | | | | | |
|---|---|---|---|---|---|---|---|---|
| | One | Two | Three | Four | Five | Six | Seven | Eight |
| Zero | 0 | 0 | 0 | 0 | 0 | 0 | 0 | 0 |
| One | 1 | D1 | D2 | D3 | D4 | D5 | D6 | S1 |
| Two | 1 | D7 | D8 | D9 | D10 | D11 | D12 | X |
| Three | 1 | D13 | D14 | D15 | D16 | D17 | D18 | S3 |
| Four | 1 | D19 | D20 | D21 | D22 | D23 | D24 | S4 |
| Five | 1 | E1 | E2 | E3 | E4 | E5 | E6 | E7 |
| Six | 1 | D25 | D26 | D27 | D28 | D29 | D30 | S6 |
| Seven | 1 | D31 | D32 | D33 | D34 | D35 | D36 | X |
| Eight | 1 | D37 | D38 | D39 | D40 | D41 | D42 | S8 |
| Nine | 1 | D43 | D44 | D45 | D46 | D47 | D48 | S9 |

TABLE 3

NIC Phase Encoding E bits vs Phase

| E6 | E5 | E4 | Phase |
|---|---|---|---|
| 1 | 1 | 1 | 0% |
| 0 | 0 | 0 | +20% |
| 1 | 0 | 0 | +40% |
| 0 | 1 | 0 | −40% |
| 1 | 1 | 0 | −20% |

Network Independent Clocking (NIC) involves the encoding and decoding of the phase relationship of the external clocks relative to the clock derived from the network. Whenever the DA is operating as a synchronous DCE, the following requirements are in effect for the connection:

1) Circuit 113 (Transmitter Signal Element Timing—DTE) will not be used.
2) Circuit 114 (Transmitter Signal Element Timing—DCE) is supplied by the DA for use in data transfer from the DTE to the DA on Circuit 103.
3) Circuit 115 (Receiver Signal Element Timing—DCE) is supplied by the DA for use in data transfer from the DA to the DTE on Circuit 104.

In this mode of operation, the DA is the master and provides both of the timing signals (i.e. circuits 114 and 115). As such it will not be measuring and encoding the phase relationships of any of the timing signals. It may, however, have to decode the phase information being received on the B-Channel for use in adjusting the phase of the output of Circuit 115. Such would be the case if the far end DA is operating as a synchronous DTE.

Whenever the DA is operating as a synchronous DTE, the following requirements are in effect for the connection:

1) Circuit 113 (Transmitter Signal Element Timing—DTE) is supplied by the DA for use in data transfer from the DA to the DCE on Circuit 103.

2) Circuit 114 (Transmitter Signal Element Timing—DCE) will not be used.

3) Circuit 115 (Receiver Signal Element Timing—DCE) is supplied by the DCE for use in data transfer from the DCE to the DA on Circuit 104.

To perform NIC, Circuit 115 must be monitored and the phase relationship encoded into the transmitted B-Channel. The received phase encoded information will also have to monitor for possible phase adjustment of Circuit 113.

Figure 3:
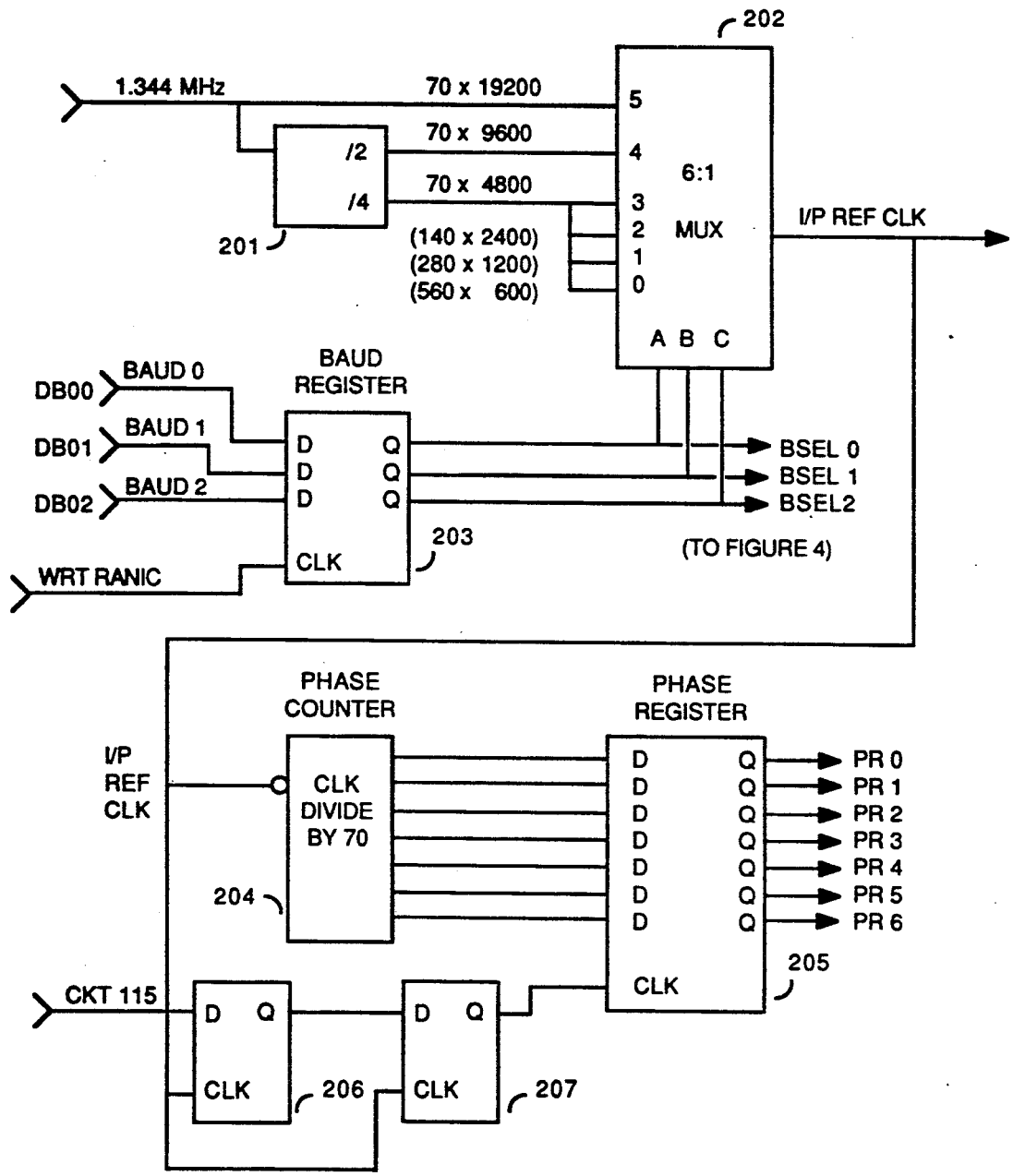
FIG. 3 is a block diagram of the network independent clocking encoding circuit.
Figure 4:
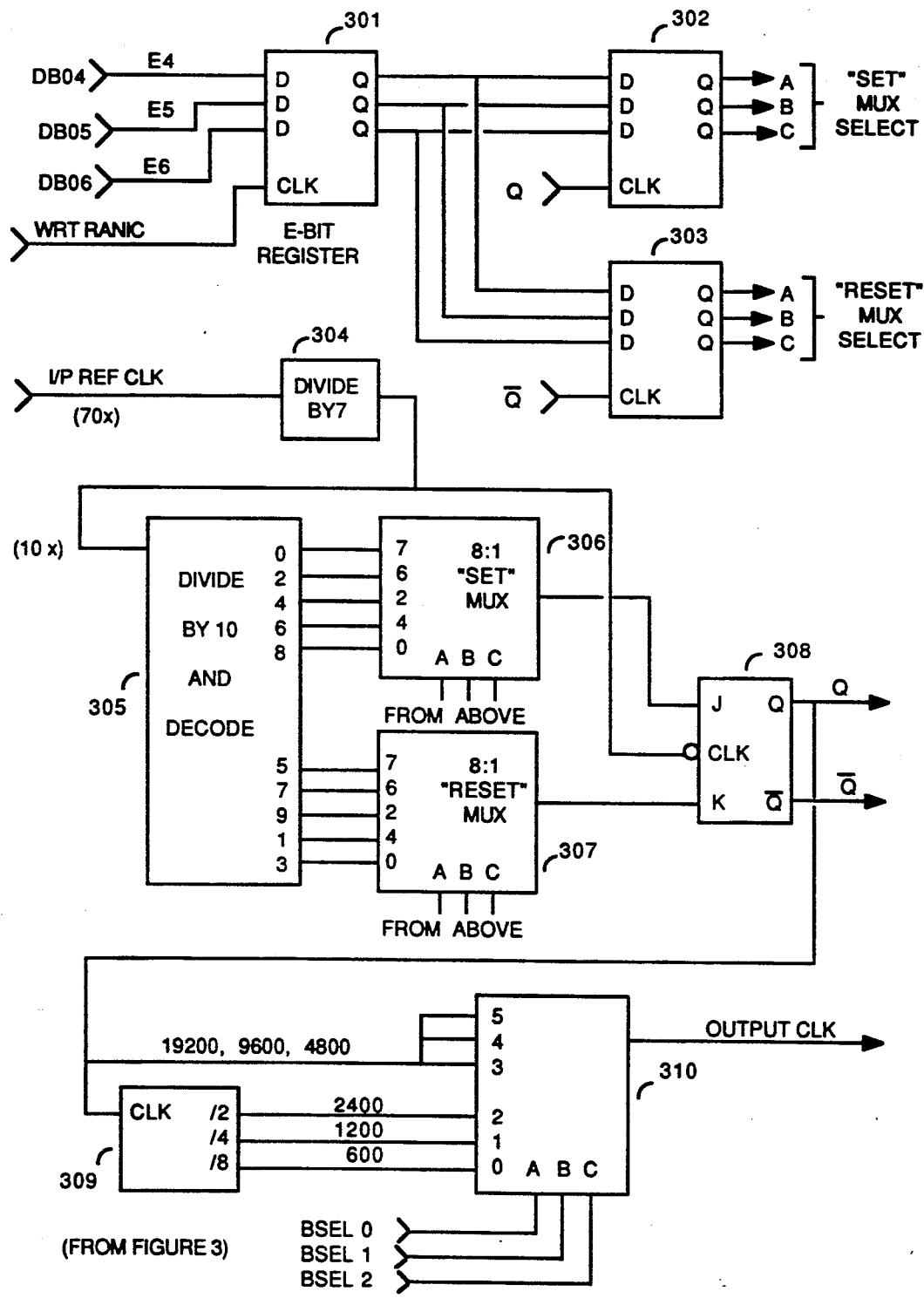
FIG. 4 is a block diagram of the network independent clocking decoding circuit.

The implementation of this feature involves the hardware as shown in FIGS. 3 and 4. FIG. 3 shows the circuit to measure the phase relationship of Circuit 115 relative to the network derived 1.344 Mhz clock. This circuit generates an Input Reference Clock which is 70 times the expected frequency of Circuit 115 for the bit rates of 19200, 9600 and 4800 bps by dividing the 1.344 Mhz clock signal an appropriate number of times. The DSP 1001 of FIG. 2 writes the baud rate into the BAUD REGISTER 203. The output of BAUD REGISTER 203 signals the 6:1 MUX 202 to output the proper reference clock signal.

The reference clock is then divided by 70 (204) and latched on the edge of Circuit 115 by PHASE REGISTER 205. The PHASE REGISTER 205 can then be read my DSP 1001 of FIG. 2. The PHASE REGISTER 205 should then show the same count at all times if the frequency of Circuit 115 is exactly matched to the network. If the frequency is slightly off, this count will slowly change. Therefore, any changes in the count read by DSP 1001 of FIG. 2 (in the range of 0 to 69) can be equated to a phase shift (but not an absolute phase difference) from the previously measured reference. The firmware can then determine when a change in the encoded phase information is required in accordance with ECMA 102. Even though the counter will cycle 2, 4, or 8 times for the bit rates of 2400, 1200 or 600 bps, the phase measurement is the correct measurement since the compensation within the frame only affects one bit at the 4800 bps rate of the adapted frame, or $\frac{1}{2}$, $\frac{1}{4}$, or $\frac{1}{8}$ of the user bit.

Figure 5:
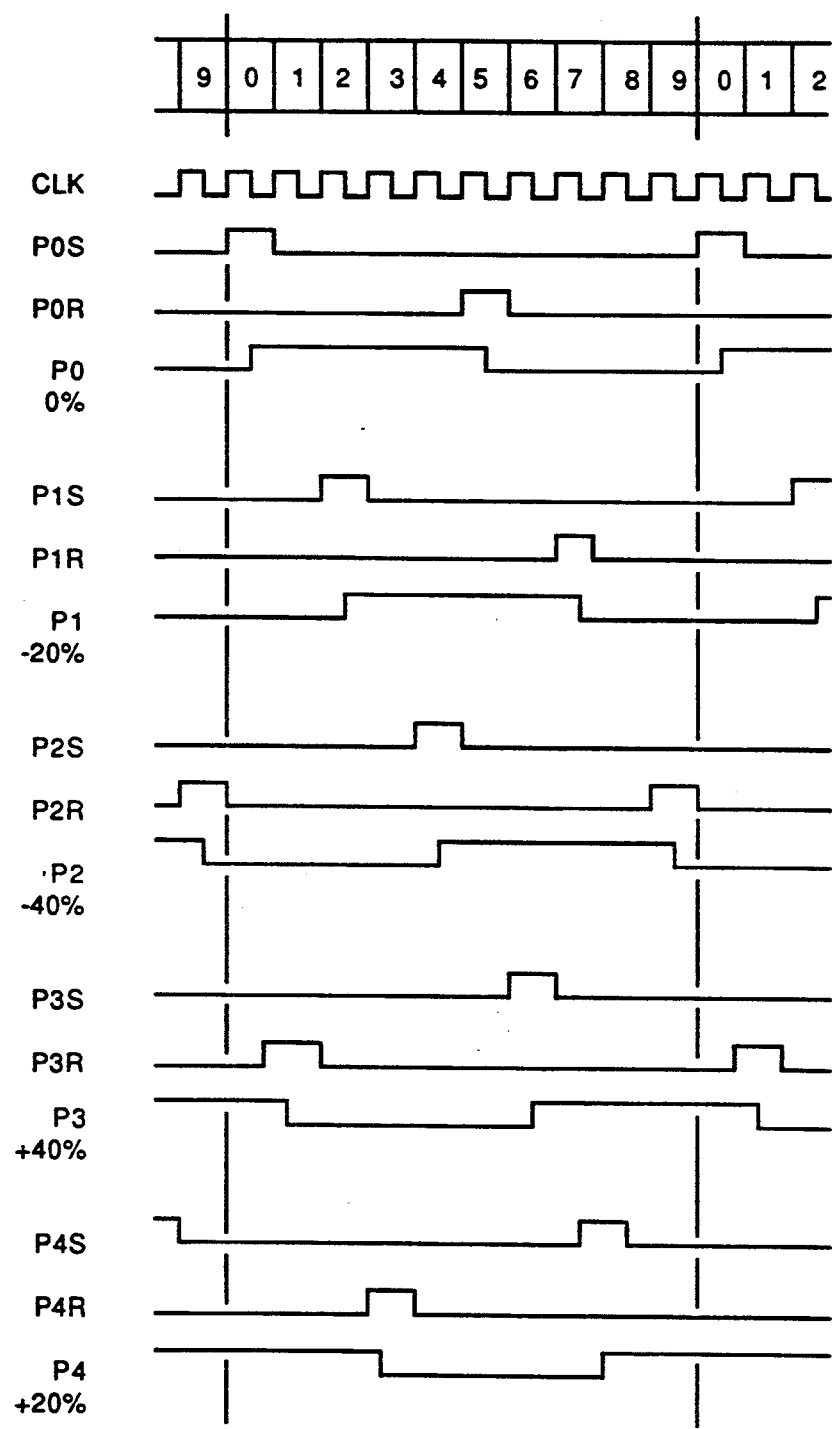
FIG. 5 is a timing diagram of the network independent clocking decoding circuit.
Figure 6A:
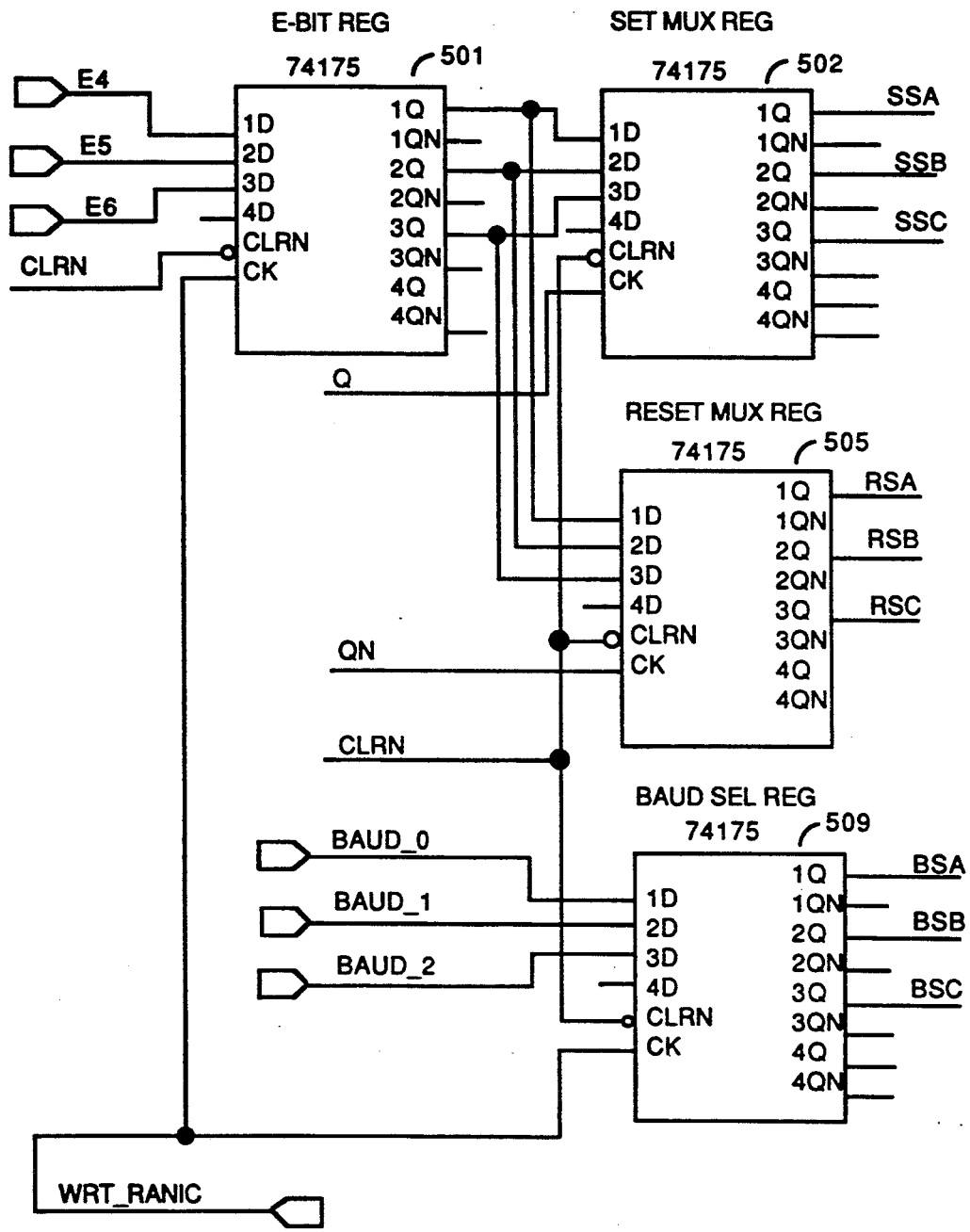
FIG. 6A and 6B are schematic diagram of the network independent clocking encoding circuit.
Figure 6B:
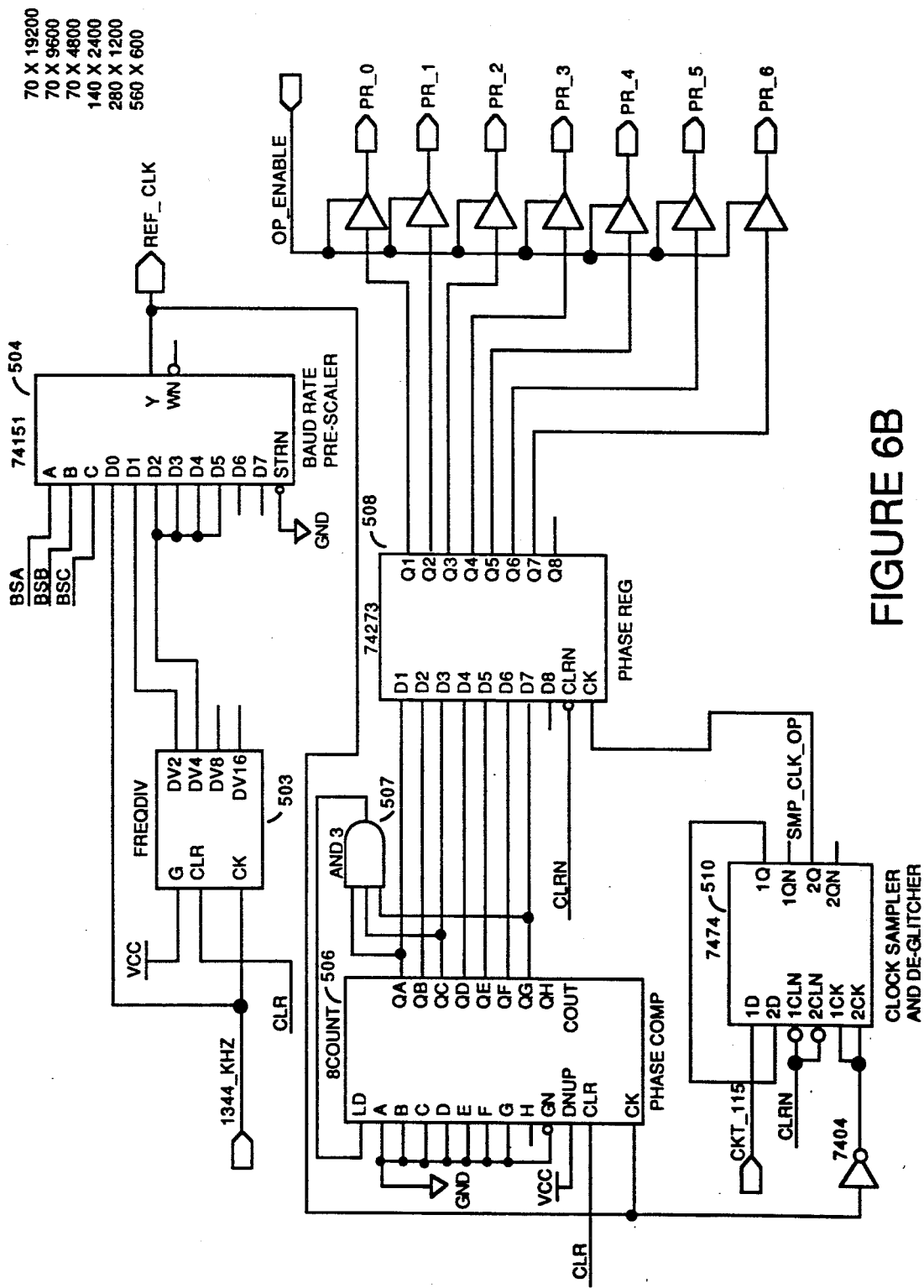
Figure 7A:
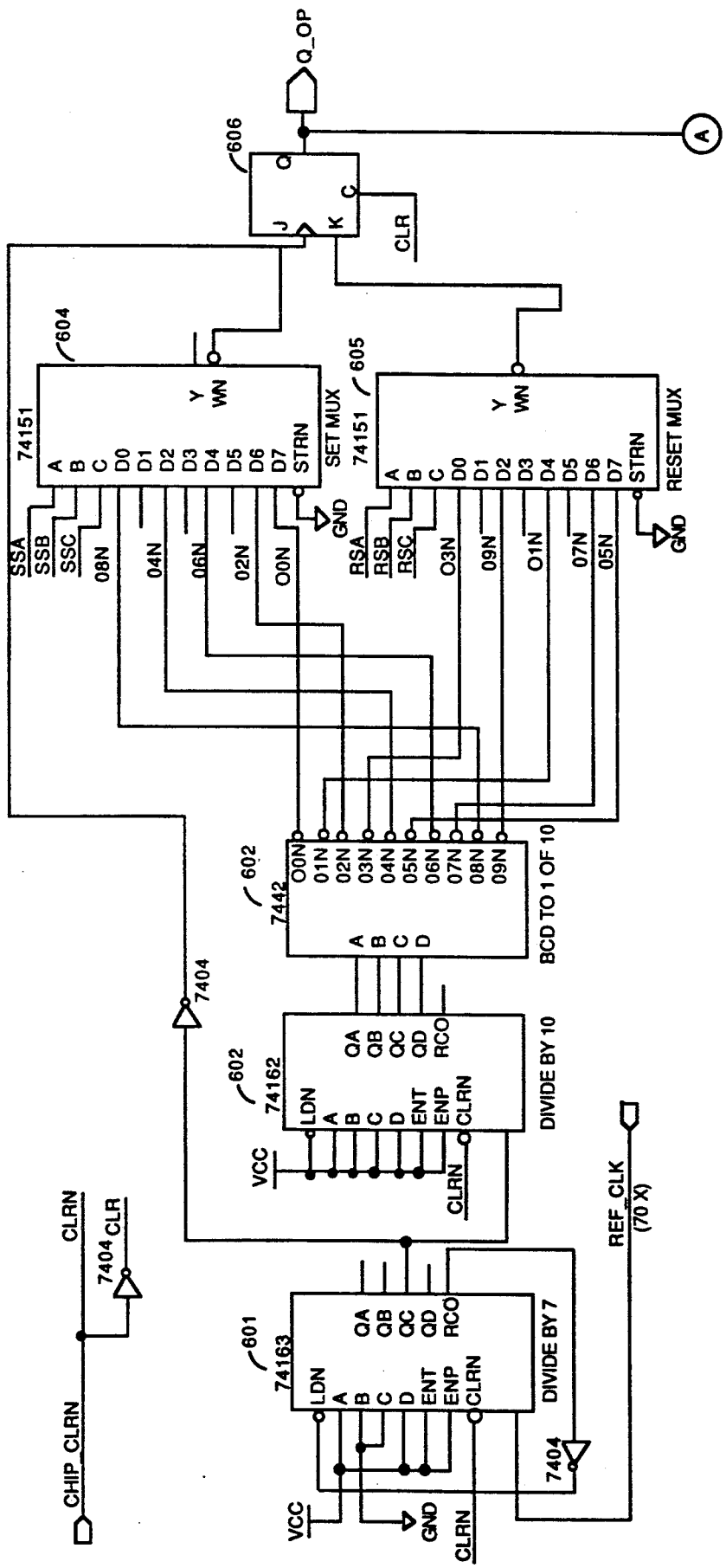
FIG. 7A and 7B are schematic diagram of the network independent clocking decoding circuit.
Figure 7B:
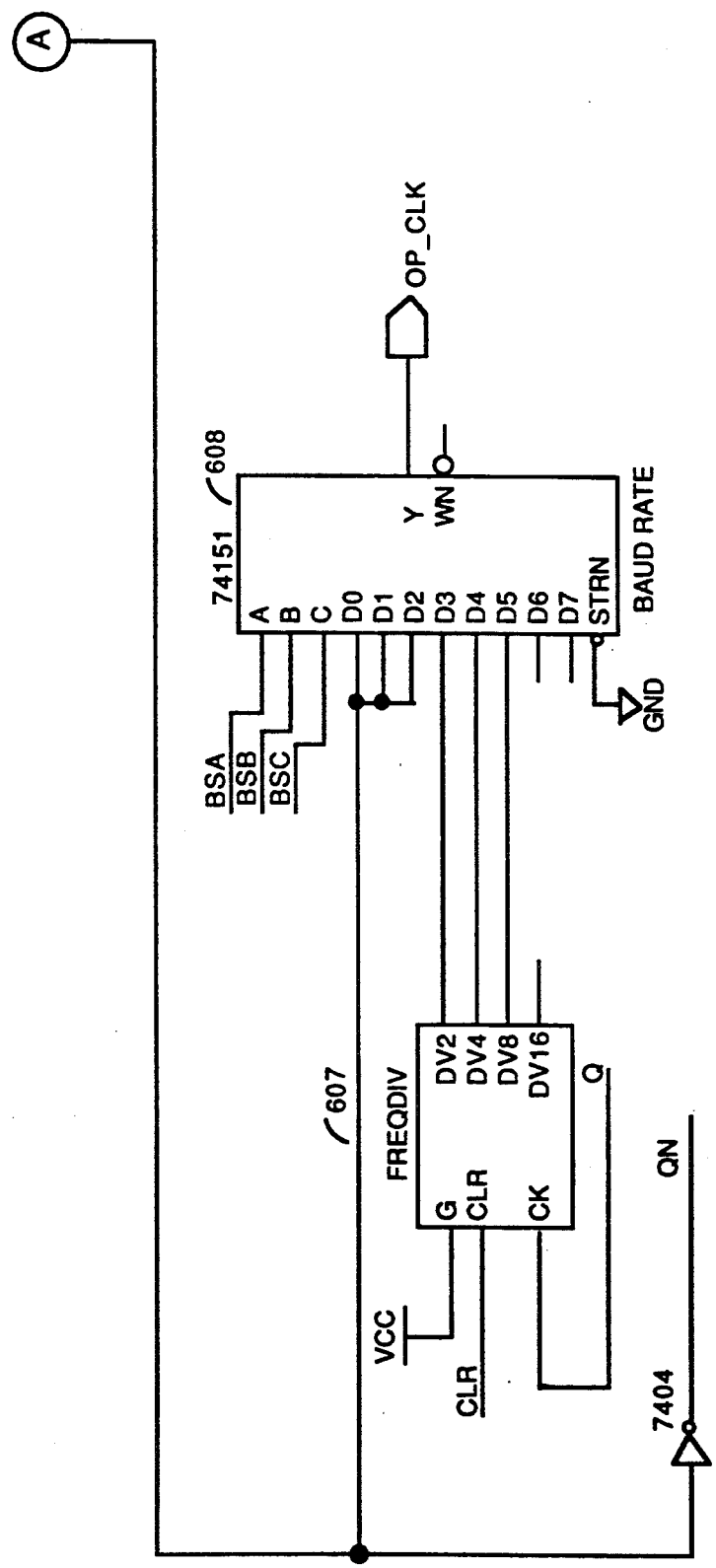

FIG. 4 shows the circuitry necessary to produce an output clock with an adjustable phase. This phase can change in steps of 20% in accordance with ECMA 102. The Input Reference Clock from FIG. 3 is first divided by 7 (304) to produce a 10× clock. This is then divided by 10 (305) and decoded to produce set and reset pulses of 5 different phases as shown in FIG. 5. These pulses are then selected by MUXES 306 and 307 according the received phase encoded information (E4, E5, and E6 also see TABLE 2) to set and reset JK flip flop 308. Since the minimum frequency of the output of this JK flip flop 308 is 4800 Hz, this signal is then divided by 2, 4, and 8 (309) and then selected by MUX 310 to produce the final Output Clock to be supplied as either Circuit 113 (DA=DTE) or 115 (DA=DCE). The purpose of the separate latches 302 and 303 for storing the select lines to the two muxes is to prevent the introduction of extra pulses due to a change in phase.

Under normal operation incorporating NIC, the DSP (1001 of FIG. 2) will read the received E-bits and load them into this circuit. This operation is only done in the synchronous mode and only for bit rates of 19,200, 9600, and 4800. These bit rates have a one-to-one representation of the data bits within the rate adaptation frame. Because the compensation process involves the addition or deletion of a whole bit, the phase of the clock is gradually shifted to provide either one more or one less pulse over some period of time. This then compensates for the difference in actual received bit rates.

This operation is not necessary for the lower bit rates of 2400, 1200, and 600. For these bit rates, the user data bits are repeated within the frame by a factor of two-, four-, or eight-to-one. The firmware normally deletes these repeated bits, and it will also delete or ignore the extra or missing compensation bit. Since the compensation is performed in firmware and the compensation bit therefore is not transferred to the hardware, the phase shifting is not needed for these bit rates.

Although the preferred embodiment of the invention has been illustrated, and that form described, it is readily apparent to those skilled in the art that various modifications may be made therein without departing from the spirit of the invention or from the scope of the appended claims.

What is claimed is:

1. A network independent clocking (NIC) circuit which allows a local synchronous master to exchange data at a baud rate with a remote synchronous master, said local synchronous master being connected to a local data adapter and said remote synchronous master being connected to a remote data adapter, said NIC circuit comprising:

a phase measuring means for continually generating a local phase difference indicator where said local phase difference indicator indicates a phase relation between said local data adapter and said local synchronous master;

a transmit means for transmitting said local phase difference indicator to said remote data adapter, additionally, said transmitter means receives said exchange data from said local synchronous master and transmits said exchange data to said remote data adapter;

a receiver means for receiving a remote phase difference indicator from said remote data adapter, said remote phase difference indicator indicates a phase relation between said remote data adapter and said remote synchronous master, additionally said receiver means receives said exchange data from said remote data adapter and transmits said exchange data to said local synchronous master; and a baud clock generator means for generating a baud clock used to transfer said exchange data from said receive means to said local synchronous master, said baud clock generator uses said remote phase difference indicator to recreate said phase difference between said remote data adapter and said remote synchronous master at said baud rate.

2. A network independent clocking (NIC) circuit as claimed in claim 1, said phase measuring means comprising:

a first clock generator means for generating a phase clock whose frequency is a first even multiple of said baud rate;

a phase counter means for circularly counting a first number of pulses of said phase clock and outputting said first number; and a phase register means for latching and storing said first number when said local synchronous master sends a bit of data, said latched and stored first number is said local phase difference indicator.

3. A network independent clocking (NIC) circuit as claimed in claim 1, said baud clock generator means comprising:

a second clock generator means for generating an intermediate clock whose frequency is a second even multiple of said baud rate;

an intermediate clock decoder means for circularly counting a second number of pulses of said intermediate clock and outputting a plurality of signals which represent said second number in a binary format; and a selector means arranged to receive said plurality of signals and said remote phase difference indicator, said selector means uses said remote phase difference indicator to select two signals from said plurality of signals, said two signals define in time the start and stop positions of said baud clock.

4. A network independent clocking (NIC) circuit which allows a local synchronous master to exchange data at a baud rate with a remote synchronous master, said local synchronous master being connected to a local data adapter and said remote synchronous master being connected to a remote data adapter, said NIC circuit comprising:

a first clock generator means for generating a phase clock whose frequency is a first even multiple of said baud rate;

a phase counter means for circularly counting a first number of pulses of said phase clock and outputting said first number;

a phase register means for latching and storing said first number when said local synchronous master sends a bit of data, said latched and stored first number is a local phase difference indicator;

a transmit means for transmitting said local phase difference indicator to said remote data adapter, additionally, said transmitter means receives said exchange data from said local synchronous master and transmits said exchange data to said remote data adapter;

a receiver means for receiving a remote phase difference indicator from said remote data adapter, said remote phase difference indicator indicates a phase relation between said remote data adapter and said remote synchronous master, additionally said receiver means receives said exchange data from said remote data adapter and transmits said exchange data to said local synchronous master;

a second clock generator means for generating an intermediate clock whose frequency is a second even multiple of said baud rate;

an intermediate clock decoder means for circularly counting a second number of pulses of said intermediate clock and outputting a plurality of signals which represent said second number in a binary format; and a selector means arranged to receive said plurality of signals and said remote phase difference indicator, said selector means uses said remote phase difference indicator to select two signals form said plurality of signals, said two signals define in time the start and stop positions of a baud clock used to transfer said exchange data from said receiver means to said local synchronous master at said baud rate.

5. A network independent clocking (NIC) circuit as claimed in claim 4, said transmitter means comprising a processor means for encoding said local phase difference indicator with said data exchanged from said local synchronous master to said local data adapter into a transmitted packet.

6. A network independent clocking (NIC) circuit as claimed in claim 4, said receiver means comprising a processor means for extracting said remote phase difference indicator and said data exchanged from said remote synchronous master to said remote data adapter from a received packet.

* * * * *